UNITED STATES PATENT OFFICE.

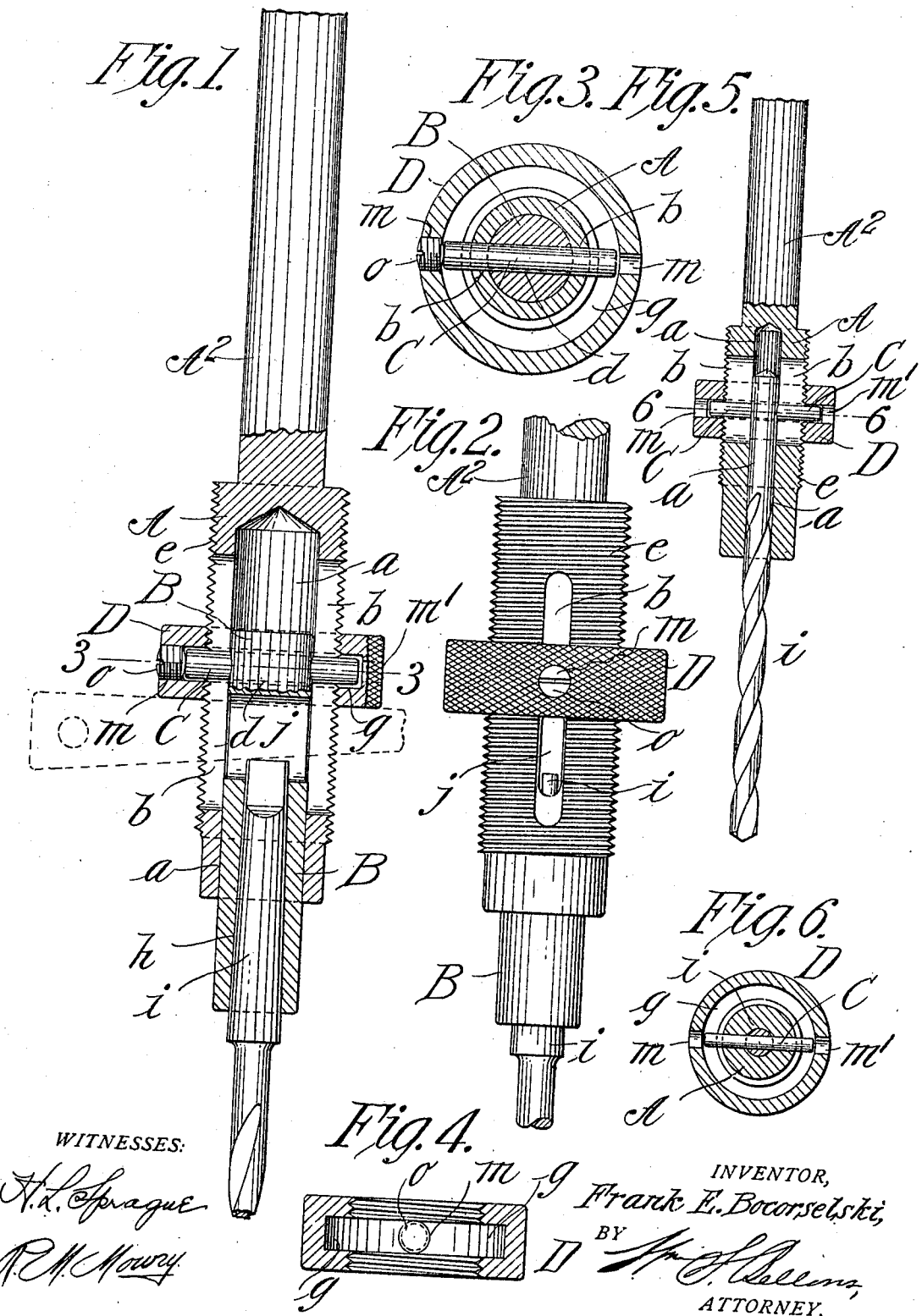

FRANK E. BOCORSELSKI, OF SPRINGFIELD, MASSACHUSETTS.

ADJUSTABLE HOLDER FOR DRILLS OR OTHER OBJECTS.

945,368.  Specification of Letters Patent.  Patented Jan. 4, 1910.

Application filed October 14, 1908. Serial No. 457,632.

*To all whom it may concern:*

Be it known that I, FRANK E. BOCORSELSKI, a citizen of the United States of America, and resident of Springfield, in the county of Hampden and State of Massachusetts, have invented certain new and useful Improvements in Adjustable Holders for Drills or other Objects, of which the following is a full, clear, and exact description.

The object of this invention is primarily to provide as a part of, and in conjunction with, a rotative shaft or spindle for carrying and driving a drill or other tool, a means for most readily and conveniently endwise adjusting the tool or a part having a socket in which the shank or tang of the tool is fitted.

The invention consists in the combination with a cylindrical externally screw threaded stock or body having an axial opening or chamber leading to an end thereof, and said chambered body having diametrically opposite slots through its walls,—this element for one specific utilization of the invention being comprised as the extremity of a rotative tool carrying drill spindle,—of a part to be subjected to an endwise adjustment,—and which may be either comprised in the shank portion of a drill itself, or in a receiver for the drill shank,—said part being slidably fitted in said chamber, a bar or pin having its intermediate portion engaged through said chamber inclosed part, and having its extremities engaging through, and protruding outwardly beyond the externally threaded cylindrical body, and a nut screw engaging on said body and having an internal annular groove within which the protruding extremities of said bar are engaged.

The invention furthermore comprises certain minor features or provisions to be hereinafter pointed out; and the invention which is hereinafter described in detail in conjunction with the accompanying drawings, illustrating its embodiment as an adjustable drill holder, is elementally set forth in the claims.

In the drawings:—Figure 1 is a substantially central section longitudinally of the tool carrying portion of a drill spindle, such for instance as employed in series in multiple spindle drills; Fig. 2 is a side elevation as seen at right angles to Fig. 1; Fig. 3 is a horizontal cross section on line 3—3, Fig. 1; Fig. 4 is a sectional view of the ring nut comprised in the device. Fig. 5 is a view similar to Fig. 1, but showing a somewhat simplified or more direct acting form of the device. Fig. 6 is a cross sectional view on line 6—6, Fig. 5.

Similar characters of reference indicate corresponding parts in all of the views.

In the drawings,—A represents a cylindrical externally screw threaded stock or body, comprised as the lower and somewhat enlarged portion of a drill spindle $A^2$, the same having an axial bore or chamber $a$ therein which opens to its lower end. The said part A has diametrically opposite slots $b\ b$ through its walls, which open to the chamber $a$.

B represents the part to be subjected to endwise adjustment, the same being slidably fitted in the said chamber $a$ for axial movement; and it has a perforation $d$ transversely through it at an upper portion thereof.

C represents a bar or pin, the intermediate portion of which is tightly engaged with a driving fit in and through the aforementioned perforation $d$ of the chamber inclosed part B and its extremities engage through and protrude outwardly beyond the externally threaded cylindrical body or stock A.

D represents a ring nut which engages, and by rotation may be run up and down on the screw threads $e$ of the part A; and said ring nut is constructed with an internal annular, and circularly continuous, groove, within which the protruding extremities of said bar or pin C are engaged.

The bar or pin being when the parts are assembled so rigidly engaged with the element B to be endwise adjusted that its extremities are in effect the same as trunnions for such part and being engaged at opposite sides thereof by the opposite walls of each of the slots $b$, the rotative movement of the slotted part will necessarily correspondingly rotate the part B; but by reason of the further engagement of the extremities with the bar or pin in the annular groove $g$ of the ring nut, the changing of position of the ring nut either higher or lower by turning it about the externally screw threaded part A effects the raising or lowering of the part B whenever such needs endwise adjustment.

In Figs. 1, 2 and 3, the part B is represented as a receiver or "collet" having a tapered socket *h* for receiving the shank or tang *i* of a drill. This receiver or "collet," or shank receiving part is made with an axis-intersecting-slot *j*, the plane of which is coincident with the slots *b b* through the chambered body or stock,—this slot *j* being in communication with the inner end of the tang receiving socket *h* so that it becomes easy, by the introduction of a drift through the slots *b b* and *j* to expel the tightly seated tang of the drill from within the socket *h* therefor.

In Fig. 5, instead of providing a collet or tool receiver in the bore or chamber of the part A, the cylindrical shank of the drill itself is slidably fitted in the chamber and the bar or pin C engages directly through the drill shank; but it is entirely immaterial whether this engagement is directly through the shank of the drill or through the separately made part, as the one B, in which the drill is received, and with which, so far as this invention is concerned, the drill is unitary.

In both examples of the device, the internally grooved ring nut is shown as provided with apertures *m*, *m′* therethrough in diametrically opposite arrangement, one *m* thereof being of slightly greater diameter than that of the bar C, and allowing for the insertion therethrough of the bar to its proper position. The opposite aperture *m′* is to permit, by the use of a small rod, the pin to be driven out from its operative position as occasion therefor, when the parts are to be separated, require.

When the pin is directly engaged through the shank of the drill, as shown in Fig. 5, the removal and replacement of the pin is necessary each time a drill is removed and replaced; but this frequency of removal of the pin is not necessary in the form of the device comprising the tool receiver or collet shown in Fig. 1.

In Fig. 1, a screw plug *o* is shown as closing the aperture *m*, a provision of apparent desirability.

As a tool holder for multiple spindle drills, this device has special aptitude as will be appreciated when it is taken into account that the drills of a gang by becoming broken, or requiring to be reground in different extents, are found of varying lengths, and inasmuch as it is required that they shall have their ends all in one uniform working plane, the desirability of a quick and convenient means of adjustment is apparent.

The part through which the bar C engages and by which it is moved or adjusted on the line of its axis, of course, may be some other element or object than either a drill shank, or a receiver for one.

I claim:—

1. A cylindrical, externally screw-threaded stock or body having an axial chamber therein, said chambered body having slots through its opposite walls, a tool-receiving member slidably fitted in said chambered body, a pin, fitted transversely in and projecting beyond each side of said tool-member and having said projections engage said slots and a nut-screw engaging said externally threaded body and having an internal annular groove into which said transverse pin projects and is inclosed, said nut-screw having diametrically opposite apertures communicating with said groove, one of said apertures being adapted to receive said pin, and the other being smaller to obstruct said pin, but large enough to receive a driving element.

2. A cylindrical, externally threaded stock or body having an axial chamber therein, said body having diametrically opposite vertical slots, through its walls, a tool-receiving member slidable in said chamber and having a suitable socket in its projecting end, a pin secured in said slidable member and having ends projecting through said slots, an annular nut-screw engaging the external threads of said body and having an internal annular groove, said projecting ends of said pin projecting in said groove and being inclosed thereby, said nut-screw being constructed to permit the removal of said pin simultaneously from said groove and tool-receiving member.

3. In combination, a cylindrical, externally screw-threaded, stock or body having an axial endwise opening chamber therein, and said chambered body having slots through its opposite walls, a socketed shank receiving part, to be subjected to endwise adjustment, slidably fitted in said chamber, and having an axis-intersecting slot in a plane coincident with the slots through said body, to which said slot the inner end of the socket in the shank receiving part communicates, a bar having its intermediate portion engaged through said shank receiving part, and having its extremities engaging through, and protruding outwardly beyond, the externally threaded cylindrical body, and a nut screw-engaging on said body, and having an internal annular groove, within which the protruding extremities of said bar are engaged.

4. A tool-holder comprising a cylindrical externally threaded body, having an axial chamber formed therein and diametrically opposite slots formed through its walls, a tool socketed member slidably fitted in said chambered body, a pin entered through said slidable member and projecting through said slots and beyond the same, a collar threaded on the outside of said body and having a central internal groove and diametrically opposite apertures communicating with said groove, said pin axially fitting one of said apertures but being diametrically larger than the other, the ends of said pin being inclosed by said groove and the larger aperture being closed by a threaded screw, whereby, when said screw is removed, said pin may be driven out through said larger opening.

Signed by me at Springfield, Mass., in presence of two subscribing witnesses.

FRANK E. BOCORSELSKI.

Witnesses:
WM. S. BELLOWS,
G. R. DRISCOLL.